June 23, 1925.
J. G. EKLUND
BASKET MAKING MACHINE
Filed July 13, 1922     3 Sheets-Sheet 3
1,542,930
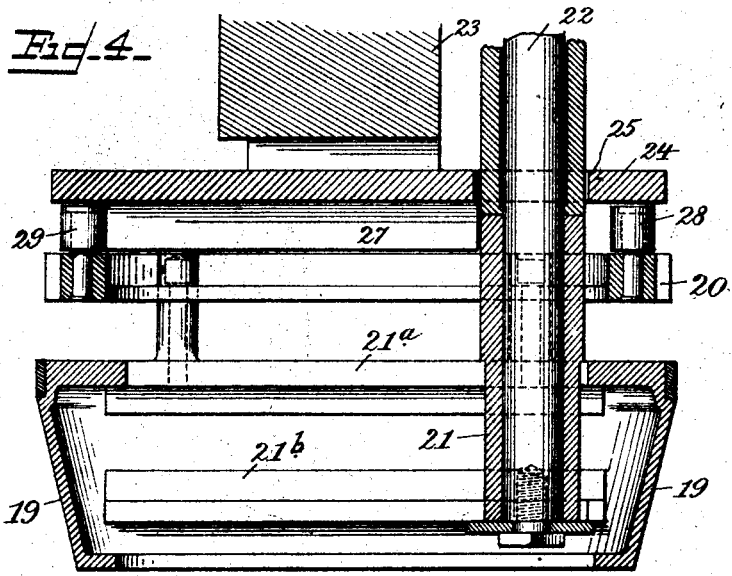
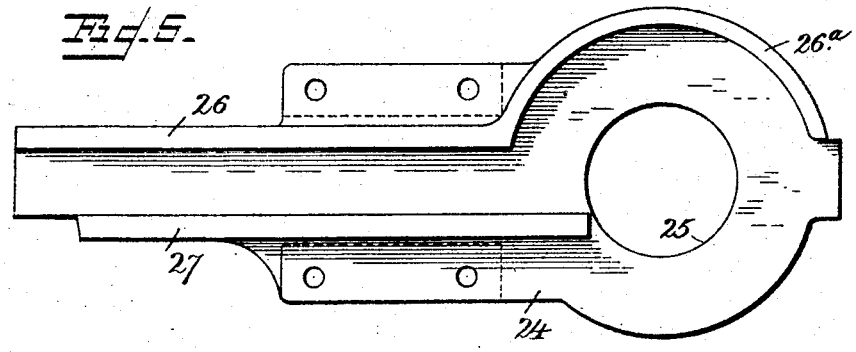
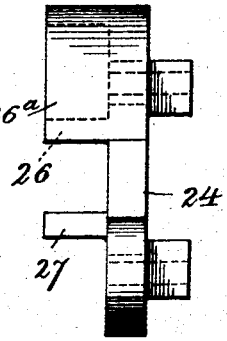
WITNESSES
Charles N. Ourand
Philip E. Siggers
John G. Eklund, INVENTOR,
BY
ATTORNEY Patented June 23, 1925.

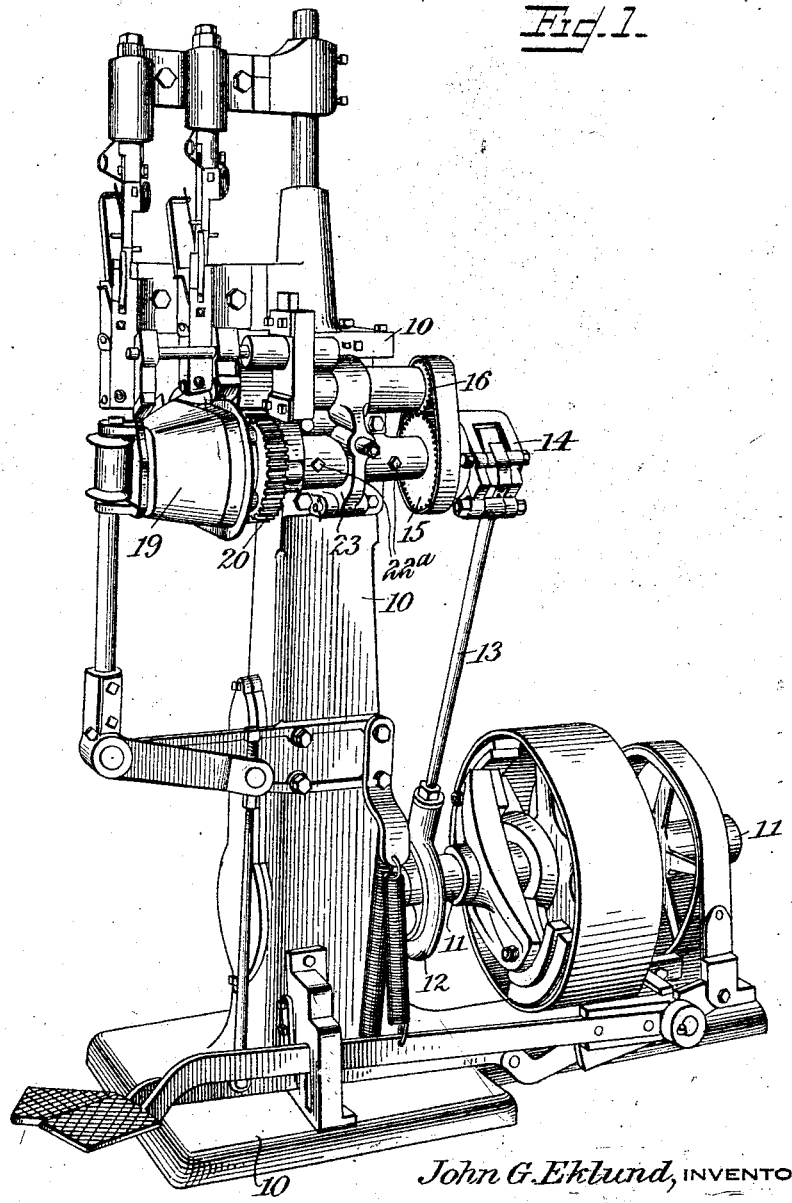

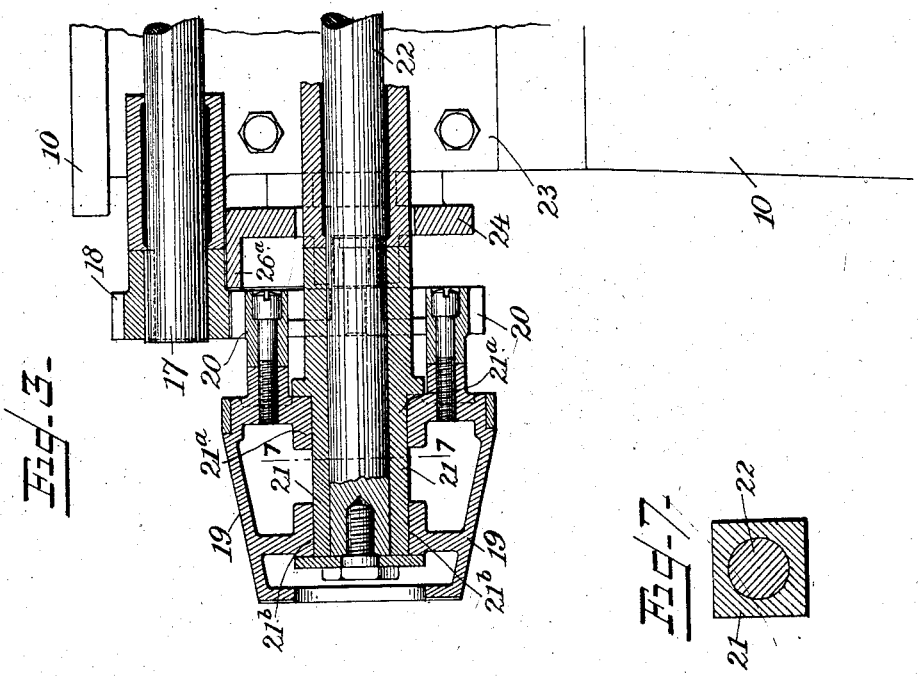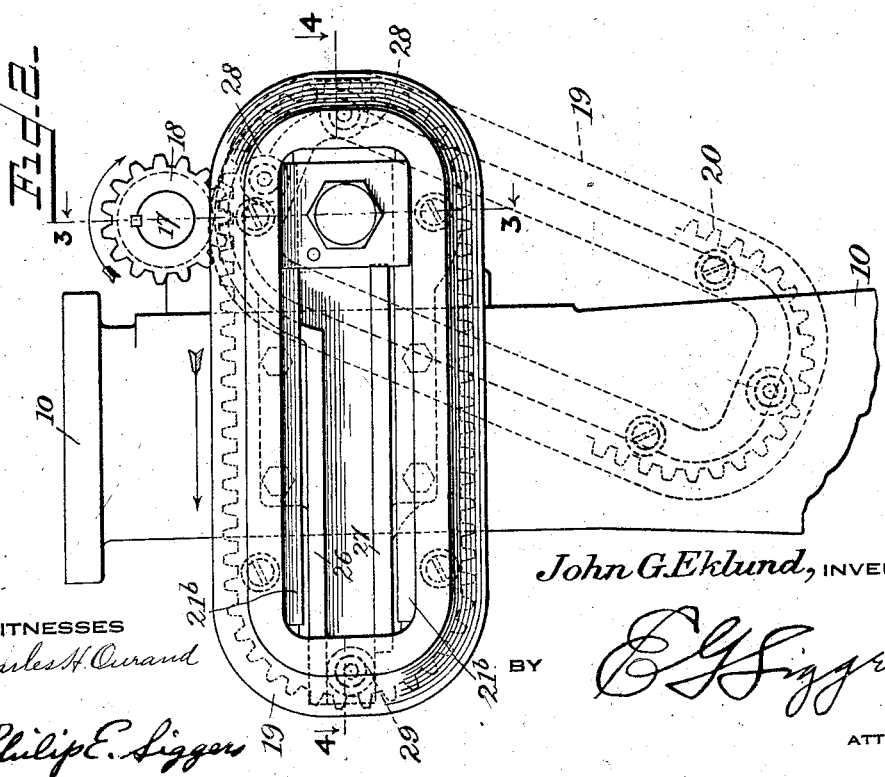

1,542,930

UNITED STATES PATENT OFFICE.

JOHN G. EKLUND, OF ST. JOSEPH, MICHIGAN, ASSIGNOR TO ST. JOSEPH IRON WORKS, OF ST. JOSEPH, MICHIGAN, A CORPORATION OF MICHIGAN.

BASKET-MAKING MACHINE.

Application filed July 13, 1922. Serial No. 574,753.

*To all whom it may concern:*

Be it known that I, JOHN G. EKLUND, a citizen of the United States, residing at St. Joseph, in the county of Berrien and State of Michigan, have invented new and useful Improvements in Basket-Making Machines, of which the following is a specification.

This invention relates to basket making machines, and it aims to provide an improved means for operating and guiding the form upon which the basket is stapled.

The invention has various other aims which will appear from the following description of a preferred embodiment thereof.

The invention preferably is used in connection with machines for making fruit baskets, particularly those baskets of oblong form having rounded ends and tapering sides known to the trade as "Climax" baskets. The present machine is an improvement on the machine patented November 14, 1911, No. 1,008,455.

In the accompanying drawings showing an illustrative embodiment of the invention, Figure 1 is a perspective view of a basket stapling machine equipped with the improved form and form operating mechanism;

Figure 2 is an elevation showing the form and its mounting;

Figure 3 is a vertical section on the line 3—3 of Figure 2;

Figure 4 is a horizontal section on line 4—4 of Figure 2;

Figure 5 is a side elevation of the form guide bracket; and

Figure 6 is an elevation of the same looking from the right hand end of Figure 5.

Figure 7 is a cross section on the line 7—7 of Figure 3.

Referring more specifically to the illustrative embodiment of the invention shown in the drawings, and first particularly to Figure 1, the basket stapling machine includes a base and main frame 10, which supports a driven shaft 11, rotated by any desirable means, for example by a belt and pulley. Upon the shaft 11 a crank disc or eccentric 12 is made fast, and a pitman 13 connects the crank disc with a ratchet mechanism 14 of any well known construction. The ratchet 14 is operatively connected with a gear 15 supported upon the frame 10 and driving a smaller gear 16 secured upon a shaft 17, shown in Figures 2, 3 and 4. By means of the mechanism so far described, the shaft 17 is driven intermittently, or with a step-by-step motion, in one direction during rotation of the shaft 11.

Upon the end of shaft 17 remote from the gear 16, a pinion 18 is mounted to operate the form 19. The latter carries a rack 20 preferably in spaced relation thereto as seen in Figures 3 and 4, and the pinion 18 meshes with said rack so that rotation of shaft 17 moves the form. In order to support the form in proper position, a square crosshead 21 is provided, this crosshead being in turn supported by the main frame 10 and being received between a slot 21ª and a pair of slides 21ᵇ provided within the interior of the form. The square crosshead 21 is shaped as best seen in Figures 3 and 7, so that the form is permitted to slide in a longitudinal direction upon the crosshead but cannot move in planes transverse with respect to the form. One means of supporting the crosshead 21 as shown in the drawing includes a non-revolving shaft 22 secured by screws 22ª (Fig. 1) upon a bracket 23 supported by the main frame. The rear part of crosshead 21 may be circular in section, and the crosshead is bored interiorly as shown, so that it may revolve about shaft 22 as an axis when the form 19 revolves.

In order to control the movements of the form 19 there is provided a form guide bracket 24 which is held upon the frame and whose construction will be understood from Figures 4, 5 and 6. The form guide bracket 24 has a circular bore 25 at one end so as to enable the circular part of the crosshead 21 to pass therethrough, and the bracket end which has the circular bore 25 is circular shaped as seen in Figure 5. The form parallel guide bracket also has a pair of guide strips or tracks 26 and 27, the guide strip 27 being straight and extending between the bore 25 and the smaller end of the guide bracket but terminating somewhat short of that end. The guide strip 26 is straight for a portion of its length, but includes an arcuate section 26ª which extends about the periphery of the circular portion of the guide bracket. The arcuate extent of the guide strip 26ª is somewhat less than a semi-circle, and in the preferred embodiment shown in the drawing, approximates 145°. The form guide bracket is mounted upon the machine frame so that the strip 26 is uppermost and the straight section thereof is horizontal, whereupon the guide strip 27, being parallel thereto, is likewise horizontal.

The rack 20 supports a pair of rollers 28, 29, one at each end thereof as shown in Figures 2 and 4. These rollers are designed to travel between and in contact with the guide strips 26 and 27 and to run along the inner face of strip 26ª so as to maintain the teeth of the rack 20 directly in mesh with the teeth of the pinion 18 and so as to give the required movement to the form.

When the pinion 18 is rotated intermittently in the direction indicated by the arrow in Figure 2, the form will travel horizontally in the indicated direction until one of the rollers 29 reaches the extremities of the guide strips 26 and 27, when, as shown in Fig. 2, the guide 27 no longer offers a support for said roller. Continued rotation of the pinion will cause the form to swing in a counterclockwise direction, about shaft 22 as an axis, as shown in dotted lines in Fig. 2, and the roller 28 will then engage the inside surface of the guide strip 26ª. During the swinging of form the teeth of the rack will always be maintained in mesh with the pinion, because of the arcuate shape of the guide strip 26ª and because it is concentric with the shaft 22. When the form has been swung into horizontal position again, the roller 28 will be received between parallel guide strips 26 and 27, whereupon the form will travel for the second time in the direction indicated but upside down as compared to its initial position, that of Figures 2 and 4. Thus it is seen that principally because of the construction of the form guide bracket 24, the form is constrained to move first in a horizontal direction, then to rotate through one-half of a revolution and then to move longitudinally for the second time, and finally to rotate once more through one-half of a revolution, whereupon a basket which is mounted upon the form will have been presented to the stapling mechanism throughout its entire perimeter.

It will be understood that the pinion 18 is given an intermittent motion in order that the basket upon the form may move step by step, and so that after each step of such movement, a staple or the like is driven into the basket.

While I have described and shown a preferred embodiment of the invention, it will be understood that many changes involving omission, substitution, alteration and reversal of parts may be made without sacrificing any of the advantages of my invention, which is best defined in the following claims.

What is claimed is:

1. In a basket stapling machine of the type employing a traveling basket form and having a frame and means for intermittently driving the form, the combination therewith of a form guide bracket affixed to the frame, said bracket having a pair of parallel guide strips one of which is shorter than the other, the longer guide strip joined with an arcuate guide strip, and rollers on the form adapted to move between and in contact with said guide strips to control the motion of the form.

2. In a basket stapling machine of the type employing a traveling basket form and having a frame and means for intermittently driving the form, the combination therewith of a form guide bracket affixed to the frame, said bracket having a pair of parallel guide strips one of which is shorter than the other, the longer guide strip joined with a substantially semi-circular guide strip, and a pair of rollers on opposite ends of the form adapted to move along said guide strips and between the parallel portions thereof to control the motion of the form.

3. In a basket stapling machine of the type employing a traveling basket form and having a frame and means for intermittently driving the form, the combination therewith of a form guide bracket affixed to the frame, said bracket having a straight guide strip terminating short of both ends, and a longer guide strip parallel to the short guide strip and extending to both ends of the bracket, a portion of the longer guide strip being arcuate, and rollers carried by the form and adapted to travel along and between said guide strips to control motion of the form.

4. A form guide bracket for basket stapling machines having means for attachment to the machine frame, a pair of guide strips projecting from one face thereof, said strips being parallel for a portion of the length of the bracket, and one strip terminating short of each bracket end, the other strip having an arcuate portion extending beyond one end of the shorter strip.

5. A form guide bracket for basket stapling machines having means for attachment to the machine frame, a pair of guide strips projecting from one face thereof, said strips being parallel for a portion of the length of the bracket, and one strip terminating short of each bracket end, the other strip having an arcuate portion and extending to the bracket ends.

6. A form guide for basket stapling machines having means for attachment to the machine frame, a pair of guide strips projecting from one face thereof, one guide strip extending continuously throughout the length of the bracket and having an arcuate portion at one end of the bracket which is nearly a half circle, the other guide strip being shorter and terminating short of both bracket ends and parallel to the longer guide strip, the short guide strip extending beyond the point where the straight portion of the longer guide strip merges into the arcuate portion.

7. A form guide bracket for basket stapling machines having means whereby it may be secured in position between the form and the frame of the machine, and having guide members or tracks projecting from one face thereof, one guide member being straight for a portion of its length and arcuate for the remainder of its length, the terminal of the arcuate portion being in line with the straight portion of said guide member, the other guide member being parallel to said straight portion and of approximately the same length but longitudinally displaced relative to said straight portion by a short distance.

8. In a basket stapling machine of the type employing a traveling basket form and having a frame and means for intermittently driving the form about a shaft as an axis, the combination therewith of a form guide bracket affixed to the frame, said bracket having a pair of parallel guide strips one of which is shorter than the other, the longer guide strip joined with an arcuate guide strip, and rollers on the form adapted to move along said guide strips to control the motion of the form, said arcuate guide strip being concentric with the axis about which the form revolves and adapted to provide a track for one of the rollers during the major part of each half revolution of the form.

9. In a basket stapling machine, the combination of a frame, a rectangular crosshead mounted on said frame to rotate upon its longitudinal axis, a basket form movable longitudinally on said crosshead, a form guide bracket fast to the frame and providing two spaced tracks extending toward the form, and rollers carried by the form and adapted to travel along and between surfaces of said tracks during movement of the form, said tracks being so shaped as to control the movement of the form in alternate straight line paths while permitting it to swing through half a circumference about the axis of the crosshead as a center at the end of each longitudinal movement.

In testimony that I claim the foregoing as my own, I have hereto affixed my signature.

JOHN G. EKLUND.